United States Patent [19]

Aalbers

[11] Patent Number: 4,513,013

[45] Date of Patent: Apr. 23, 1985

[54] PREPARATION OF MALT AND BEER HAVING A LOW NITROSAMINE CONTENT

[75] Inventor: Vas J. Aalbers, Leiden, Netherlands

[73] Assignee: Heineken Technisch Beheer, B.V., Zoeterwoude, Netherlands

[21] Appl. No.: 498,036

[22] Filed: May 31, 1983

Related U.S. Application Data

[63] Continuation of Ser. No. 315,493, Oct. 27, 1981, abandoned, which is a continuation of Ser. No. 142,111, Apr. 21, 1980, abandoned.

[30] Foreign Application Priority Data

Mar. 28, 1980 [NL] Netherlands ..................... 8001872

[51] Int. Cl.$^3$ .................. C12C 1/00; C12C 11/00; A23L 1/202
[52] U.S. Cl. ......................................... 426/16; 426/29; 426/309; 426/460; 426/462; 435/185
[58] Field of Search ................... 426/16, 29, 309, 456, 426/459, 460, 462; 435/185

[56] References Cited

U.S. PATENT DOCUMENTS 3,030,279  4/1962  De Ryhove et al. ............... 435/185
3,446,708  5/1969  Hollenbeck et al. ............... 435/185

FOREIGN PATENT DOCUMENTS 110840  3/1965  Netherlands .
909659  10/1962  United Kingdom .

*Primary Examiner*—David M. Naff
*Attorney, Agent, or Firm*—Fleit, Jacobson, Cohn & Price

[57] ABSTRACT

During the kilning of germinated barley in the course of a malting operation nitrosamines are usually formed and ultimately these end up in beer obtained from such malt. It has been found that such formation of nitrosamines can be suppressed even in the absence of sulphur dioxide when the germinated barley is treated with a solution or dispersion of saccharides before it is kilned.

6 Claims, No Drawings

PREPARATION OF MALT AND BEER HAVING A LOW NITROSAMINE CONTENT

This application is a continuation of application Ser. No. 315,493, filed Oct. 27, 1981, now abandoned, which is a continuation of application Ser. No. 142,111, filed Apr. 21, 1980, now abandoned.

BACKGROUND OF THE INVENTION

1. Field of the Invention

This invention relates to a process for preparing malt, in which barley is moistened and kept at a germinating temperature until germinated barley is obtained, after which the germinated barley is dried and heated (kilned) in a stream of heated air.

2. Discussion of the Art

Some time ago it was discovered that nitrosamines may, under certain conditions, have a carcinogenic effect. Nitrosamines may occur in beer, and many countries require its content of nitrosamines to be below a very low limit.

It was known that these nitrosamines are not present in the malt in appreciable quantities before the kilning process, but are formed therein during kilning, whence they find their way into the beer.

In the majority of conventional kilning processes, the very moist germinated barley (circa 45% water) is brought into direct contact with a stream of heated gas, whereby the germinated barley is first dried and then heated at a temperature at which the enzymes are largely preserved, and growth is stopped. The removal of the moisture requires a continuous stream of air of a moderately high temperature, and this air is commonly produced by mixing combustion gases with secondary air.

During the combustion of the fuel used, owing to the high flame temperature an amount of nitrogenous oxides is formed, and these are carried along with the stream of gas to the kiln. The germinated barley always contains amino groups, which then react with the nitrogenous oxides to ultimately form the nitrosamines. In vitro the reaction only proceeds to an appreciable extent in a narrow pH range.

In an alternative kilning process the barley is heated indirectly by hot gases, while a stream of secondary air is passed through the barley. In that case nitrogenous oxides from the combustion gases cannot of course react with the barley. Even so, nitrosamines are often produced in the malt, as the air passed through the barley is withdrawn from the atmosphere, which especially in industrial areas and densely-populated areas contains appreciable proportions of nitrogenous oxides, which lead to the formation of nitrosamines. Furthermore, a kilning process with indirect heating has the disadvantage of requiring considerably more expensive equipment, while the total energy consumption is approximately 5% higher.

Up until several years ago, the fuel used in the kilning process was coal or a petroleum product. These fuels virtually all have a considerable sulphur content.

From environmental considerations and urged by authorities, maltsters then changed over to the use of low-sulphur fuels for the kilning process, such as natural gas, which is virtually free of sulphur.

It then turned out that kilning with a low-sulphur fuel resulted in the proportion of nitrosamines in the resulting malt and the beer prepared from it being much higher than when sulphur containing fuels were used.

For this reason the kilning process is at present often carried out using natural gas as the fuel and adding sulphur dioxide to the stream of air, for example, by combusting sulphur. This may indeed result in a low content of nitrosamines, but is only successful if a certain concentration of sulphur dioxide is maintained during the first kilning phase.

A conventional value for the content of sulphur dioxide is 1000 g/ton air-dry barley to be steeped. If the supply of sulphur dioxide is interrupted, nitrosamines will still be formed, and these are not decomposed when sulphur dioxide is again supplied.

The disadvantages of that method are, therefore, as follows:

(a) kilning becomes more complicated and requires more intensive and more accurate supervision;

(b) there is yet an effluent of sulphur dioxide, which is undesirable from environmental considerations, and may well be more hazardous than the nitrosamines themselves;

(c) sulphur dioxide may give rise to the corrosion of kilning equipment.

Up until now, the maltster has been unable to control the nitrosamine level without using sulphur dioxide, as he is dependent on the proportions of nitrogenous oxides in the kilning air drawn in.

SUMMARY OF THE INVENTION

It has now been found that, with the use of a low-sulphur fuel, such as natural gas, it is yet possible, without adding sulphur dioxide, to prepare a malt having a very low content of nitrosamines, while the beer prepared from that malt also has a very low nitrosamine content. The process according to the invention is applicable to both kilning with direct heating and with indirect heating.

According to the present invention from zero to 48 hours before the start of the kilning step, the germinating barley is moistened with an aqueous liquid which, calculated on the air-dry barley to be steeped, contains 0.1–1.0% by weight, and preferably 0.2–0.8% by weight of starch and/or its products of hydrolysis and/or other carbohydrates before the barley is contacted with combustion gases.

The nature of the starch or its products of hydrolysis or other carbohydrates has been found not to be very critical. It is not certain owing to what mechanism the addition of the aqueous liquid according to the invention prevents the formation of nitrosamines, even if nitrogenous oxides are present. This may well be due to the micro-organisms, which are always present on and in barley.

Nevertheless it is surprising that this simple step can adequately prevent the formation of nitrosamines in an effective and foolproof manner, while further during kilning no particular measures are required, so that the process can be conducted under optimum conditions.

In a prior process for preparing malt, disclosed in Dutch Pat. No. 110,840, the barley is moistened with a solution containing 1–5% by weight of sugar, calculated on the air-dry barley to be steeped, and this not more than 48 hours before kilning. According to the patent, the sugar used may be a monosaccharide, such as glucose, or a disaccharide, such as saccharose, or a trisaccharide or dextrine. Preferably, according to the patent, glucose is used. During the further processing of the malt thus produced, it is found that not only does the added sugar end up in the extract, but in addition a larger part of the starch contained in the barley is converted into sugars and becomes available for fermentation.

When less than 1% by weight of sugar is used, the effect referred to is hardly, or at all, obtained.

A major part of the glucose is found in the wort in a later stage. This changes the wort composition, in particular the sugar composition of the wort. For this reason this prior process has meanwhile been discarded.

The addition of the aqueous liquid according to the present invention does not involve any difficulties in practice, because during the germination of the barley it is necessary to add water regularly anyway in order that the barley is uniformly moistened while being turned over. The same apparatus can now be used for adding the aqueous liquid containing the starch or its products of hydrolysis or other carbohydrates. In practice this aqueous liquid contains so much water that the total amount of liquid is just sufficient for uniformly moistening all of the barley without a portion of the liquid dripping from the barley again. If the amount of water were too large, the quantity of starch or its products of hydrolysis or other carbohydrates that leaked away would of course be inactive.

The products of hydrolysis of starch comprise many monosaccharides and oligosaccharides, of which maltose and glucose are the best known ones. Depending on the methods of hydrolysis used, products of hydrolysis also contain saccharose, fructose, dextrines and many others.

In the following example, the method according to the invention is illustrated with reference to the use of glucose solution.

EXAMPLE

Green malt prepared from 50 tons of air-dry barley was sprayed with 400 kg glucose dissolved in 1800 liters of water 24 hours before the supply of combustion gases was started. In this way the malt was just uniformly moistened with the liquid applied without liquid dripping from the mass.

Immediately after the spraying, the pH of the grain surface was measured to be 6.1.

Thereafter germination was allowed to be completed in the usual way. At the end of that period the pH of the grain surface was found to be 5.0.

Thereafter kilning was carried out in the usual way, using direct heating with a mixture of air and combustion gases produced by combusting natural gas. As a result the gas mixture supplied was practically free from sulphur.

After kilning the nitrosamine content in the malt was determined and found to be less than 5 microgrammes per kg.

In a blank test carried out under the same conditions with a similar barley mixture, but without spraying with a glucose solution, the amount of nitrosamines was found to be 42 microgrammes per kg. Subsequently beer was brewed from both batches of malt by a conventional method.

The beer produced from the malt prepared according to the present invention was found to have such a low content of nitrosamines that, in view of the accuracy of analysis, it must be doubted that it contained any nitrosamines at all.

The beer produced from the blank batch of malt was found to contain a quantity of nitrosamines which, by present-day standard, was impermissibly high.

I claim:

1. In a malting process in which barley is moistened and kept at a germinating temperature until germinated barley is obtained, after which the germinated barley is kilned in a stream of heated air which is produced from low sulfur fuel and does not contain added sulphur dioxide, said kilning being continued until a dry malt is obtained, the improvement comprising producing a malt having a low nitrosamine level by treating the germinated barley up to 48 hours before the start of kilning with an aqueous liquid which contains from 0.2% to 0.8% by weight, based on the air-dry weight of the barley, of a carbohydrate material selected from the group consisting of monosaccharides and oligosaccharides.

2. The malting process according to claim 1, wherein the carbohydrate material is selected from the group consisting of glucose, maltose and saccharose.

3. The malting process according to claim 2, wherein the carbohydrate material is glucose.

4. In a beer brewing process comprising the steps of moistening barley, keeping the barley at a germinating temperature until germinated barley is obtained, kilning the germinated barley in a stream of heated air which is produced from low sulfur fuel and does not contain added sulphur dioxide, said kilning being continued until a dry malt is obtained, grinding the malt, and enzymatically hydrolyzing the starch in the malt to obtain water-soluble saccharides, fermenting a solution of said saccharides, and finishing the fermented solution to obtain beer, the improvement comprising producing a beer having a low nitrosamine level by treating the germinated barley up to 48 hours before the start of kilning with an aqueous liquid which contains from 0.2% to 0.8% by weight, based on the air-dry weight of the barley, of a carbohydrate material selected from the group consisting of monosaccharides and oligosaccharides.

5. The beer brewing process according to claim 4, wherein the carbohydrate material is selected from the group consisting of glucose, maltose and saccharose.

6. The beer brewing process according to claim 5, wherein the carbohydrate material is glucose.

* * * * *